United States Patent
Rahman et al.

(10) Patent No.: US 12,525,659 B2
(45) Date of Patent: Jan. 13, 2026

(54) ENCLOSED BATTERY EMISSIONS DILUTION AND SAMPLING

(71) Applicant: HORIBA INSTRUMENTS INCORPORATED, Irvine, CA (US)

(72) Inventors: Montajir Rahman, Irvine, CA (US); Richard Stocker, Irvine, CA (US); Terry Sobczak, Irvine, CA (US)

(73) Assignee: HORIBA INSTRUMENTS INCORPORATED, Irvine, CA (US)

( * ) Notice: Subject to any disclaimer, the term of this patent is extended or adjusted under 35 U.S.C. 154(b) by 336 days.

(21) Appl. No.: 18/452,131

(22) Filed: Aug. 18, 2023

(65) Prior Publication Data

US 2025/0060234 A1    Feb. 20, 2025

(51) Int. Cl.
*H01M 10/42* (2006.01)
*G01M 3/26* (2006.01)

(52) U.S. Cl.
CPC ......... *H01M 10/4285* (2013.01); *G01M 3/26* (2013.01)

(58) Field of Classification Search
CPC ... H01M 10/4285; G01M 3/26; G01M 3/3254
See application file for complete search history.

(56) References Cited

U.S. PATENT DOCUMENTS

| | | | |
|---|---|---|---|
| 5,487,312 A | 1/1996 | Kahl et al. | |
| 6,387,706 B1 | 5/2002 | Eden | |
| 6,505,523 B1 | 1/2003 | Taylor et al. | |
| 9,658,146 B2 | 5/2017 | Olson et al. | |
| 11,201,358 B1 | 12/2021 | Dimpault-Darcy et al. | |
| 2012/0156101 A1 | 6/2012 | Kreft | |
| 2012/0239308 A1 | 9/2012 | Miller et al. | |
| 2023/0253632 A1* | 8/2023 | Cohen | H01M 10/4285 429/9 |
| 2024/0418610 A1* | 12/2024 | Huemiller | G01N 1/24 |

FOREIGN PATENT DOCUMENTS

| | | |
|---|---|---|
| CN | 206773155 U | 12/2017 |
| CN | 109959579 A | 7/2019 |
| CN | 210572642 U | 5/2020 |
| CN | 112858496 A | 5/2021 |
| CN | 113791358 A | 12/2021 |
| CN | 114046908 A | 2/2022 |
| CN | 216117937 U | 3/2022 |
| CN | 114415045 A | 4/2022 |
| CN | 115155438 A | 10/2022 |
| CN | 218383215 U | 1/2023 |
| CN | 112798049 B | 3/2023 |
| KR | 20120050667 A | 5/2012 |
| KR | 20230064919 A | 5/2023 |
| WO | 2022223959 A1 | 10/2022 |

OTHER PUBLICATIONS

International Search Report and Written Opinion for PCT/US2024/040155 dated Nov. 5, 2024, 6 pages.

* cited by examiner

*Primary Examiner* — Justin N Olamit
(74) *Attorney, Agent, or Firm* — Brooks Kushman P.C.

(57) ABSTRACT

An enclosed battery emissions dilution and sampling system includes a heated exhaust tube, an enclosure defining at least one inlet port on one end of the enclosure and an outlet port on another end of the enclosure fed into the heated exhaust tube, a dilution air line, at least one heated inlet line arranged with an end of the dilution air line and fed into the at least one inlet port, and a bypass line connected between the dilution air line and heated exhaust tube, and around the enclosure.

7 Claims, 1 Drawing Sheet

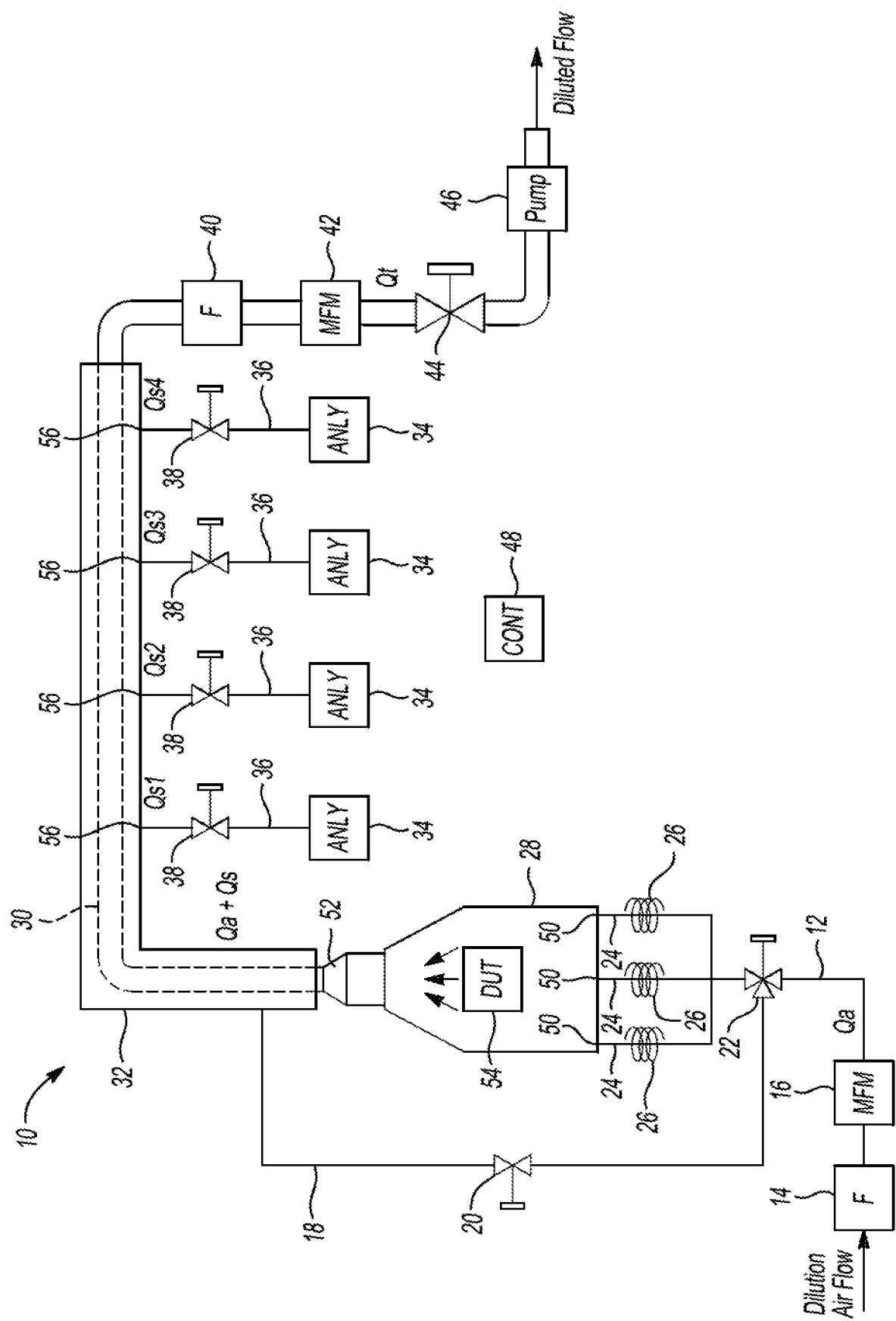

ENCLOSED BATTERY EMISSIONS DILUTION AND SAMPLING

TECHNICAL FIELD

This disclosure relates to test equipment for batteries.

BACKGROUND

Appropriate sampling can be important for measuring emissions from a battery (cell, module, pack, etc.).

A gas chromatograph-mass spectrometer can detect and identify trace amounts of volatile organic compounds and other gases emitted by batteries.

Differential scanning calorimetry instruments can measure the heat flow of a battery during its operation, allowing for the identification of exothermic reactions that might lead to thermal runaway, as well as the energy released during thermal runaway stages.

Fourier-transform infrared spectrometers can identify specific chemical bonds and functional groups present in emissions from batteries.

Real-time monitoring is a feature of some battery emissions testing equipment. Sensors can provide continuous data on temperature, gas concentrations, and other parameters during battery operation.

Some battery emissions testing equipment incorporate enclosures that can prevent energy, emissions, and debris from escaping during thermal runaway.

Equipment and controls for initiating thermal runaway in a battery can include nail penetration, controlled heating pads, and electrical connections for overcharge/overvoltage initiation.

SUMMARY

An enclosed battery emissions dilution and sampling system includes a heated exhaust tube, an enclosure, that completely contains a battery, defining at least one inlet port on one end of the enclosure and an outlet port on another end of the enclosure fed into the heated exhaust tube, a dilution air line, at least one heated inlet line arranged with an end of the dilution air line and fed into the at least one inlet port, and a bypass line connected between the dilution air line and heated exhaust tube, and around the enclosure. The system also includes a pump arranged to operate such that a portion of dilution air from the dilution air line flows through the at least one heated inlet line and enclosure over the battery to entrain emissions from the battery therein, creating diluted sample gas, and into the outlet port, and another portion of the dilution air flows through the bypass line around the enclosure, and the diluted sample gas and another portion of the dilution air mixes within the heated exhaust tube. The system further includes a controller that calculates a mass flow rate of the emissions as a difference of a mass flow rate through the heated exhaust tube and a mass flow rate through the dilution air line.

BRIEF DESCRIPTION OF THE DRAWINGS

FIG. 1 is a schematic diagram of an enclosed battery emissions test arrangement.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated or described may be combined to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Lithium-ion batteries typically include a positive electrode (cathode), a negative electrode (anode), an electrolyte solution, and a separator. The electrodes can be made of materials that intercalate (absorb) and de-intercalate lithium ions during charge and discharge cycles. The electrolyte facilitates movement of lithium ions between the electrodes, while the separator prevents electron movement through the electrolyte. This forces electrons to go through an external circuit, generating electric current.

During normal operation, lithium ions move between the cathode and anode through the electrolyte, generating heat energy. This energy is directly proportional to the flow of current. When the battery experiences an internal short, a large amount of current, and therefore heat generation, is observed. When the battery experiences an event that causes it to heat up quickly (e.g., as during thermal runaway), such as through external puncture or internal short circuits, several chemical reactions can be triggered that lead to the production of emissions.

The electrolyte in a lithium-ion battery is typically a lithium salt dissolved in a solvent. At high temperatures, the electrolyte can decompose, releasing gases such as carbon dioxide, carbon monoxide, and volatile organic compounds. This breakdown occurs due to the thermal degradation of the solvent and the lithium salt. In other variations, the electrolyte can be made of a solid material. This material can be a polymer, oxide, sulfide, halide, or other composition, and the nature and constitution of corresponding emissions can vary significantly.

The cathode material in lithium-ion batteries often contains metal oxides, such as lithium cobalt oxide or lithium iron phosphate. Cathode materials can also contain more complex compounds such as nickel manganese cobalt and nickel cobalt aluminum. At elevated temperatures, these metal oxides can undergo chemical reactions that release oxygen. If oxygen reacts with other materials within the battery, it can contribute to the generation of gases like carbon monoxide and carbon dioxide. The release of oxygen also allows for the continuous burning of lithium-ion batteries without external oxygen present.

The anode is typically made of graphite or other carbon-based materials. Other anode materials include silicon, lithium titanate oxide, and pure lithium metal. At high temperatures, these materials can react with the electrolyte or other components, potentially releasing gases. Additionally, in some cases, the anode may undergo a process in which the anode material reacts exothermically with lithium compounds, further raising the temperature.

Within the battery, there may be organic components that can oxidize or decompose at elevated temperatures. These reactions can release volatile organic compounds and other byproducts, contributing to the emissions produced during thermal runaway.

As the battery's internal temperature increases, the casing may become compromised, exposing reactive materials to the environment. This can lead to further exothermic reactions and gas generation.

The exact emissions generated during a thermal runaway event can vary based on a number of factors such as the battery chemistry, materials used, and specific conditions of the runaway. Batteries may thus be tested to evaluate the nature of their emissions and their tendency to produce the same.

Measuring battery cell emissions requires the gas output from the device under test (e.g., battery, cell, module, etc.) to be comprehensively extracted from the enclosure. The device under test however does not inherently create pressure or flow to encourage emission movement towards sample analyzers. For this reason, a test system for battery thermal runaway should be able to create a consistent flow to bring the battery emissions from the device under test location to the samplers.

Emissions should be extracted while a temperature of the device under test is maintained for thermal runaway reactions to continue. This means any dilution air into the chamber containing the device under test should match the test temperature, which can be greater than 1200° C. The emissions analysis equipment however may need the sample gas to be much cooler (e.g., less than 400° C.). The emissions analysis equipment also needs to be diluted so gases within the sample are reduced to levels acceptable to the analyzers.

Test arrangements are proposed in which, in some examples, dilution air is supplied through two paths. One bypasses a chamber, containing a device under test, at ambient temperature. The other path passes through heated elements to match the device under test temperature and is flowed through the chamber. This other path may be used prior to initiation of thermal runaway (and beginning of emissions) to purge the enclosure for some predetermined time period. The bypass path may be used before the test to give a baseline reading of the properties of the dilution air. During the test, a valve (e.g., a piezoelectric valve, a needle valve) may be used to split dilution flow between the chamber and bypass. The hot air through the chamber facilitates movement of gasses emitted from the device under test without affecting its temperature. The hot air temperature is controlled through feedback of the chamber temperature to the heating element setting for the hot air. The cold air is used post-chamber to reduce the emissions levels and temperature to within the levels suitable for analyzers. The valve defines the ratio of hot to cold air to control the emissions temperature at the point of the sampler in reaction to the device under test temperature.

The test arrangements may include a combination of an enclosure for a device under test, a supply of dilution air, and a tube and valve configuration that interfaces with the chamber. The chamber can be designed for allowing airflow when necessary.

Before a test starts, dilution air may be supplied around the bypass path. This is used as a reference for the measurement downstream. When the test starts, the valve switches and the dilution air flows over the device under test (e.g., battery cell, pack, module, etc.). This takes the emissions from the device under test through the required heated line path. The ratio of dilution air, and the temperature of the hot dilution air, is defined by the observed temperature of the device under test. The ratio for the dilution air split can vary, for example, from 80% cold and 20% hot to 80% cold and 20% hot, with the ratio defined on the required cooling post enclosure. Based on a temperature of post enclosure gasses, proportional-integral-derivative control may be used to effect the split ratio in some examples. If the test chamber is at or below the required analyzer temperature, hot air will be used in higher quantities. If the chamber temperature exceeds the maximum analyzer temperature, cold air may be used to reduce overall gas temperature before the analyzer is reached.

Those that test batteries may require an accurate estimation of gas release and analysis of the gas in real-time during battery cycling and thermal runaway events. This is particularly challenging for thermal runaway, as a large amount of gas may be generated without a consistent pressure to transfer it to the rest of the system. The use of dilution air flow through the proposed chamber may give a consistent flow and pressure to move gas through the system, allowing for consistent real-time measurement.

The contemplated approaches may also allow for the thermal runaway test to be performed effectively at the right temperatures while simultaneously bringing the gas temperature within the useable range before samples are taken for the gas analyzer.

The air flow can provide pressure, but a vacuum style approach could also be used to extract the emissions from the chamber. The way in which air flows can also be varied. Vertical airflow (bottom to top) may be preferred as it gives an even distribution and mixing of emissions, but horizontal could be used. The chamber could be cylindrical (for even distribution) or have other shapes. The way in which airflow is provided can also be varied (e.g., a series of small holes rather than one larger hole) so as to encourage turbulence and mixing of the air.

Other available systems may not extract emissions from the chamber with the same level of proposed sophistication. This means that gasses may have a delay in leaving the chamber, which may affect the reliability of the measurements. The lack of encouraged dilution/emissions mixing also means alternative designs might not have a uniform concentration of emissions/dilution, which may also affect test repeatability and may create localized samples outside of measurement range.

Referring to FIG. 1, a battery emissions test arrangement 10 includes a dilution air line 12, a filter 14, a mass flow meter 16, a bypass line 18, a valve 20, a valve 22, inlet lines 24, heaters 26, an enclosure 28, tubing 30, a heater 32, analyzers 34, analysis lines 36, valves 38, filter 40, mass flow meter 42, valve 44, pump 46, and a controller 48.

The dilution air line 12 has the filter 14 and flowmeter 16 thereon, and feeds into the valve 22. The flowmeter measures the mass flow rate through the dilution air line 12, $Q_a$, before it enters the valve 22.

The bypass line 18 branches from the dilution air line 12 upstream of the valve 22, and has the valve 20 thereon. The amount of flow through the bypass line 18 is controlled via the valve 20. When the valve 20 is closed, none of the dilution air flowing through the dilution air line 12 flows through the bypass line 18. When the valve 20 is open, a portion of the dilution air flowing through the dilution air line 12 flows through the bypass line 18 while another portion of the dilution air flowing through the dilution air line 12 flows through the inlet lines 24.

The enclosure 28 defines inlet ports 50, an outlet port 52, and is configured to contain a device under test (e.g., battery, cell, module, etc.) 54 therein. Each of the inlet lines 24 branches from the valve 22 and feeds into one of the inlet ports 50, and has one of the heaters 26 thereon. The outlet port 52 feeds into the tubing 30.

The dilution air flowing into the valve 22 is subsequently divided among the inlet ports 24 where it is heated via the heaters 26 before entering the enclosure 28. Emissions from the device under test 54 are entrained in the dilution air—creating diluted sample gas. This diluted sample gas flows through the outlet port 52 into the tubing 30.

Because the bypass line 18 also feeds into the tubing 30 downstream of the outlet port 52, the mass flow rate into the tubing 30 is thus the sum of the mass flow rate through the dilution air line 12, Qa, and the mass flow rate due to emissions from the device under test 54, Qs. As discussed in further detail below, Qs will be calculated.

The tubing 30 defines ports 56, and has the heater 32 thereon. Each of the analysis lines 36 is fed into one of the ports 56, has one of the valves 38 thereon, and is connected with one of the analyzers 34. The amount of flow through one of the analysis lines 36 is controlled via the valve 38 thereon. When the valve 38 thereon is closed, none of the diluted sample gas flowing through the tubing 30 flows through the one of the analysis lines 36. When the valve 38 thereon is open, a portion of the diluted sample gas flowing through the tubing 30 flows through the one of the analysis lines 36. The mass flow rate flowing through the one of the analysis lines 36, $Qs_n$, can be measured by the analyzer 34 connected therewith. In this example, there are four analyzers 34 and four analysis lines 36 (n=4). Thus, there are four mass flow rates flowing through the analysis lines 36, $Qs_1$, $Qs_2$, $Qs_3$, $Qs_4$. There may be a fewer or greater number of analyzers 34 and analysis lines 36 in other examples.

The tubing 30 further has the filter 40, mass flow meter 42, and valve 44 thereon downstream of the ports 56. The mass flow meter 42, which is downstream of the filter 40, measures the mass flow rate through the tubing 30, Qt. The amount of flow through the tubing 30 is controlled by the valve 44, which is downstream of the mass flow meter 42. Moving the valve 44 toward the closed position will decrease the flow through the tubing 30. Opening the valve 44 toward the open position will increase the flow through the tubing 30.

The pump 46, in this example, is connected with the tubing 30 downstream of the valve 46 and is used to create suction through the system to draw fluids through the enclosure 28 and tubing 30. The amount of flow through the tubing can also be controlled via operation of the pump 46.

The controller 48 is in communication with/exerts control over the mass flow meter 16, valves 20, 22, heaters 26, heater 32, analyzers 34, valves 38, mass flow meter 42, valve 44, and pump 46. The controller 48, for example, can generate commands to open or close the valves 20, 22, 38, 44, generate commands to activate the heaters 26, 32, etc. The controller 48 also receives data regarding the various mass flow rates mentioned above, and can calculate Qs and the dilution factor, DF, according to the following equations:

$$Qs = Qs_1 + Qs_2 + Qs_3 + Qs_4 + Qt - Qa \quad (1)$$

$$DF = (Qa + Qs)/Qs \quad (2)$$

The controller 48 can also calculate the actual concentration of gasses emitted from the device under test 54 by multiplying an analyzer concentration by DF, and subtracting from this product the background concentration of the dilution air.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The pump 46, for example, may be positioned upstream of the test arrangement 10, rather than downstream. Other components and variations are, of course, also contemplated.

The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An enclosed battery emissions dilution and sampling system comprising:
   a heated exhaust tube;
   an enclosure, configured to completely contain a battery, defining at least one inlet port on one end of the enclosure and an outlet port on another end of the enclosure fed into the heated exhaust tube;
   a dilution air line;
   at least one heated inlet line arranged at an end of the dilution air line and fed into the at least one inlet port;
   a bypass line connected between the dilution air line and heated exhaust tube, and around the enclosure;
   a pump arranged to operate such that (i) a portion of dilution air from the dilution air line flows through the at least one heated inlet line and enclosure over the battery to entrain emissions from the battery therein, creating diluted sample gas, and into the outlet port, and another portion of the dilution air flows through the bypass line around the enclosure and (ii) the diluted sample gas and another portion of the dilution air mixes within the heated exhaust tube; and a controller programmed to calculate a mass flow rate of the emissions as a difference of a mass flow rate through the heated exhaust tube and a mass flow rate through the dilution air line.

2. The system of claim 1, wherein the mass flow rate through the heated exhaust tube is a summation of mass flow rates through analyzers associated with the heated exhaust tube and a mass flow rate through the pump.

3. The system of claim 1 further comprising one or more valves on the dilution air line configured to establish a split ratio between the portion and another portion.

4. The system of claim 3, wherein the controller is further programed to implement proportional-integral-derivative control to effect the split ratio based on a temperature of gasses in the heated exhaust tube.

5. The system of claim 3, wherein the one or more valves are piezoelectric valves or needle valves.

6. The system of claim 1, wherein the controller is further programmed to purge the enclosure with dilution air for a predetermined period of time before the emissions begin to emit from the battery.

7. The system of claim 1, wherein the enclosure is arranged such that the portion flows through the at least one heated inlet line and enclosure vertically over the battery.

* * * * *